Feb. 5, 1929.

A. C. PETERSON 1,701,335

AUTOMOTIVE SUSPENSION MEANS

Filed Dec. 6, 1923     2 Sheets-Sheet 1

Inventor
Adolph Peterson

Patented Feb. 5, 1929.

1,701,335

UNITED STATES PATENT OFFICE.

ADOLPHE C. PETERSON, OF MINNEAPOLIS, MINNESOTA.

AUTOMOTIVE SUSPENSION MEANS.

Application filed December 6, 1923. Serial No. 679,028.

My invention relates to suspension means for vehicles traveling on highways or railroads but particularly to automotive suspension means, wherefore it is called an automotive suspension means.

The principal objects of my invention are to provide a means of suspension of vehicles upon wheels which suspension shall be simple, flexible, simple in construction, efficient in operation, durable in wear, less liable to breakage, independent in operation as to each wheel, easier on the vehicle body and chassis parts, softer riding, which will render the unsprung parts lighter, will provide means whereby the heavier driving parts such as transmission means, differential means, change gear means if any, steam engine driving means if used and other such driving means may be suspended upon the chassis body or frame and not upon the driving axles, and in general to provide an improved chassis suspension and improved driving means for automotive vehicles.

The principal devices and combinations of devices comprising my invention are as hereinafter described and defined in the claims.

In the accompanying drawings which illustrate my invention in several different forms, like characters refer to like parts throughout the several views.

Referring to the drawings.

Figure 1:
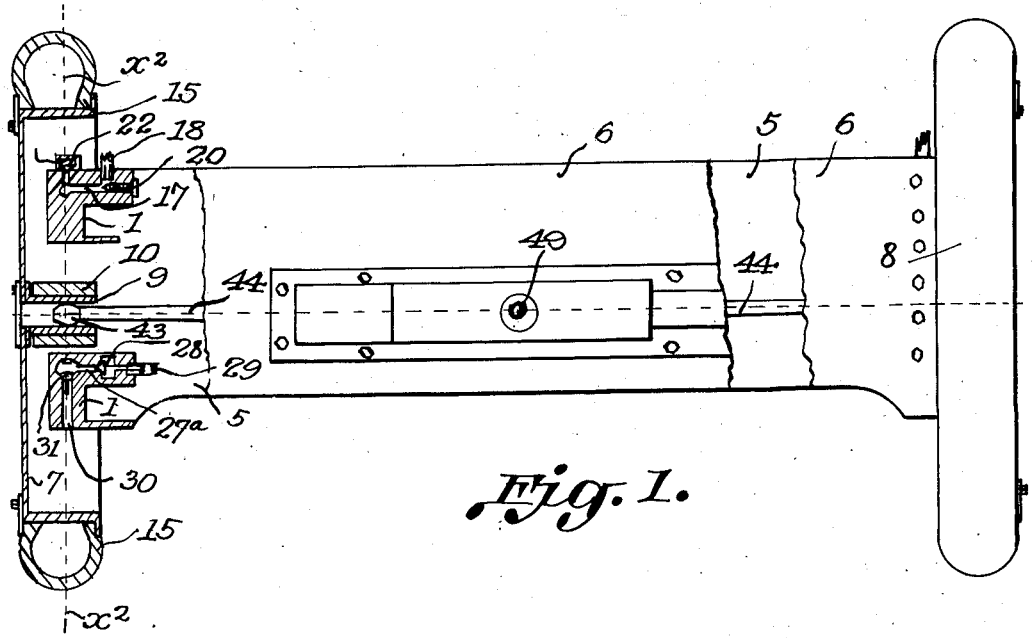
Figure 1 is a view chiefly in vertical cross section on the line $X^1$—$X^1$ of Figures 2 and 3, this view showing some parts in full side elevation and some parts broken away.
Figures 2, 6:
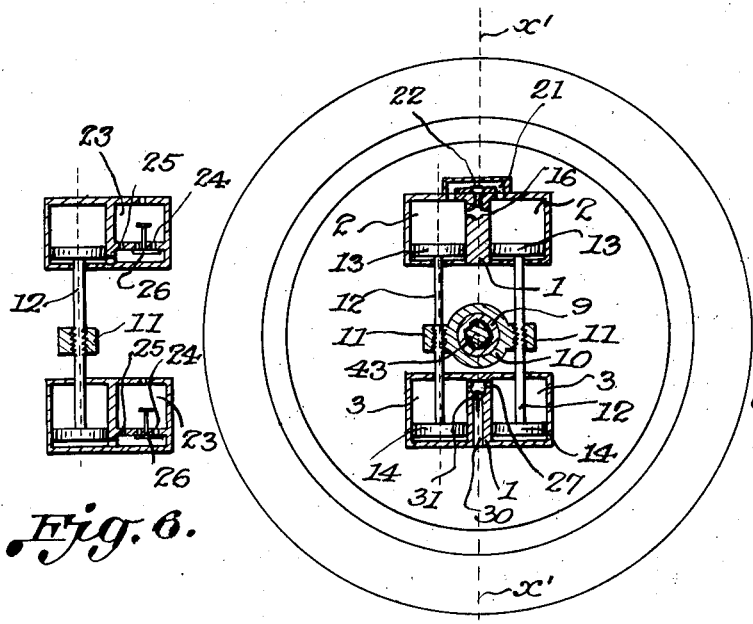
Figure 2 is a view chiefly in vertical cross section on the lines $X^2$—$X^2$ of Figure 1, this view being at right angles to that of Figure 1.
Figure 6 is a detail view showing the inside view of one of the main castings (cylinder casting) of the first form.
Figure 3:
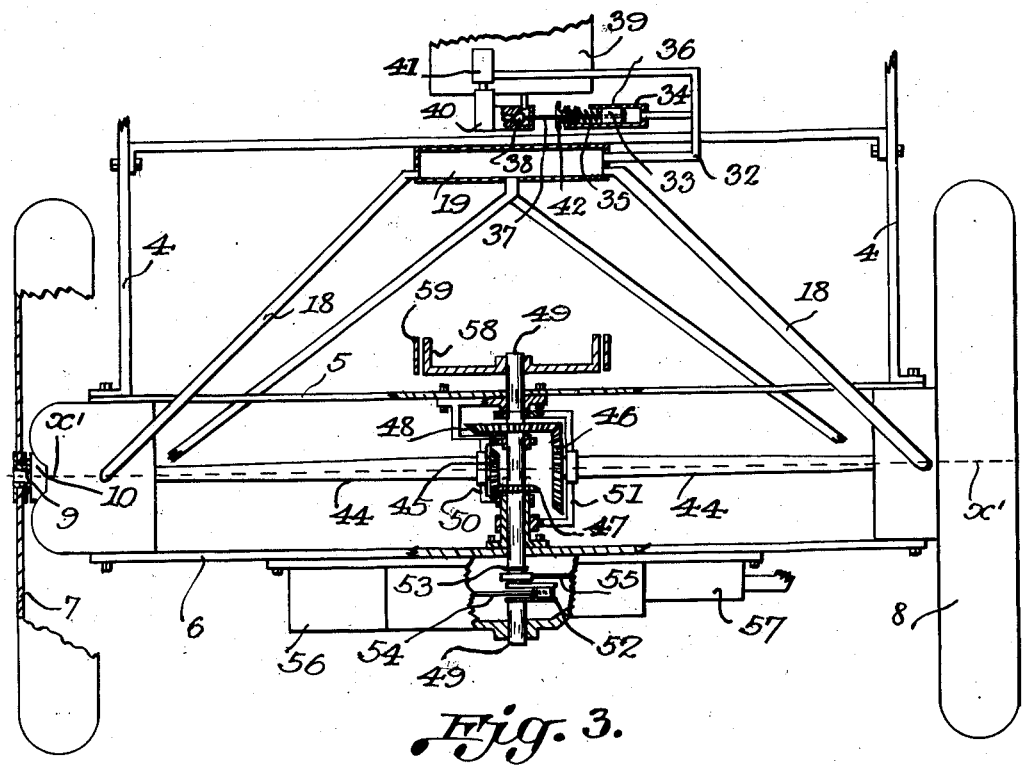
Figure 3 is a view in horizontal plan of the device shown in Figures 1 and 2.

Referring first to the form of my device shown in Figures 1, 2, and 3, the numeral 1 indicates the main casting, or forging or construction which forms the main suspension unit of my device, this main casting or forging being of semi-steel or duralumin or bronze or other strong metal and having formed with it or secured firmly to it four cylinders, upper cylinders 2 and lower cylinders 3, two upper and two lower, the two upper being vertically above and having axial centers the same as the prolonged axial centers of the two lower cylinders. There are two of these main castings 1, one as shown at each side of the chassis frame 4, these two main castings 1 being securely connected together by chassis frame cross members 5 and 6 which are securely bolted or riveted to the opposite sides of the two main castings 1 and have bolted or riveted together with them the forwardly extending chassis frame members 4 whereby the chassis frame members 4, cross members 5 and 6 and main castings 1 form an integral and rigidly connected unit. While the forwardly extended members 4 are shown broken away for simplicity in the drawing it is to be understood that these forwardly extending members constitute the side chassis frame members of a chassis and may have at their front ends any form of axle and wheel suspension or a front wheel steering suspension based on the principles of the suspension here described.

The upper cylinders 2 and lower cylinders 3 comprise two vertical pairs which as secured to the frame lie with their vertical axes in a plane exactly parallel with the line of movement of a pair of wheels 7 and 8, one related to one casting 1 and one to the other casting 1, each wheel being suspended by its axle spindle 9 which latter rotates within a bearing hub 10 (ball bearings may be interposed) the bearing hub 10 having integrally formed with it extending horizontally forwardly and backwardly from it parallel to the rolling course of the wheels stubs 11 in each of which is secured by bolting or otherwise or screwing within it a vertically placed piston rod 12 which carries at its upper and lower ends two pistons, an upper piston 13 vertically reciprocable in one upper cylinder 2 and a lower piston 14 vertically reciprocable in the related lower cylinder 3, whereby each wheel hub bearing 10 is carried by its two piston rods 12 each of which has its upper and lower piston, the four pistons of each wheel hub thereby having vertical reciprocation in four related cylinders 2 and 3, the wheel, its hub 10 and related four pistons thereby having vertical reciprocation relative to the chassis frame members 4, 5, 6, in a plane parallel to the rolling course of the wheels and being supported by the main casting 1 related to them. The wheels 7 and 8 carry at their rims automobile tires 15 as shown. Each piston is reciprocable as shown within a closed cylinder the related rod reciprocating through a head or end in a packing gland preferably, none being shown for simplicity in the drawing.

The space above the pistons in the upper cylinders 2 has each of them in the main castings 1 communication through individual related ports 16, passages 17, conduits 18 with an air or gas reservoir 19, a needle valve 20 in each main casting providing means of somewhat restricting and regulating the communication whereby there is at all times a communication through the ports 16 as restricted with the reservoir 19, except when the ports 16 are in either casting covered by the piston related to the port, this covering happening when the related pistons in the upper cylinders of one casting 1 approach their upper limits of stroke, whereby in such positions of the pistons their being no communication toward the reservoir 19 the pistons will compress the air or gas remaining above the pistons in any further upward movement of the pistons in the cylinders related. The spaces above the pistons in the upper cylinders 2 have however communication from the reservoir to the cylinders upper spaces through passages 21 as controlled by non-return check valves 22.

The spaces below the upper pistons each have communication with an individually related oil reservoir 23 through individual related passages 24 and 25 the passages 24 being the larger and controlled by a check valve 26 preventing flow except in one direction, from the oil reservoir 23 to the space below the piston, the passages 25 being relatively small whereby the communication is always maintained between any lower space and its reservoir 23 of oil but this communication is much restricted in the one direction. The lower pistons in the lower cylinders 3 have similar related oil reservoirs 23, passages 24, 25, check valves 26, whereby each lower space in the lower cylinders has the same relative communication with its oil reservoir 23.

The spaces above the lower pistons, that is in the upper part of the lower cylinders 3, have communication at the extreme upper part, each of them, through its individual port 27 controlled by a related check valve 28 preventing return flow to the cylinder space but permitting free flow to the reservoir 19 through conduits 29, and each such cylinder space above the lower pistons has also communication through a passage 30 with the atmosphere as controlled by non-return check valves 31, whereby the space above the lower pistons may each suck air from the atmosphere and compress it on upward movements into the conduits delivering to the reservoir 19.

The reservoir 19 by conduit 32 communicates its pressure to a pressure control piston 33 in cylinder 34, the pressure control piston 33 yieldably controlled by spring 35, when outwardly forced uncovers a port 36 permitting release of air to the atmosphere, and when inwardly released by too slight pressure pulls by rod 37 a valve 38 away from its seat and thereby permits steam from boiler 39 to flow to steam cylinder 40 which latter actuates air compression pump 41 supplying reservoir 19, the boiler, steam pump and air compression pump being shown diagrammatically only. This air compression pump may be of a type which will supply as needed air for tire pumping. It is to be noted that the air pressure may be instead supplied as necessary by any other compression means or gas under pressure from internal combustion cylinders or steam instead may be used properly controlled. The spring 35 may be regulated as to pressure by a regulator sleeve 42 screwable in its support whereby the pressure of air supply may be maintained at any predetermined amount.

The wheel-hubs 10 have each placed within square bores in their axial centers driving blocks 43 each of which is substantially square but of such rounded contour that it may act as a universal joint between the driving rod 44 and wheel hub, one driving rod extending from each wheel hub 10 between the cross members 5—6 toward the mid-portion of the cross members and there each having secure connection with one related bevel gear 45—46, the latter having driving contact each with one related bevel gear 47—48 the latter placed at right angles to the gears 45—46 upon a driving member or crank axle 49, the gears 45—46 being supported revolubly by related gear cages 50—51 which latter have rotatably mounting or swinging mounting upon bearings concentric with the driving member 49. The driving member 49 is revolubly mounted to rotate in an axis at right angles to the wheel axes and is supported by the cross members 5—6 and has a pair of cranks 52—53 formed integrally with it whereby a pair of connecting rods 54—55 actuated by pistons in steam cylinders 56—57 may drive the driving member 49. The driving member 49 has at its forward end a brake drum 58 whereupon a brake band 59, actuated in any way not shown may act. The steam engine cylinders 56—57 are driven by steam from the boiler 39, which may be placed in any part of the chassis frame. It is to be noted here that the steam engine cylinders may instead be placed between the cross members 5—6 and may instead of double acting cylinders be single acting cylinders placed on opposite sides of the driving member or crank axle 49, or the engine may be of any form and otherwise placed, or it is to be noted that instead of the steam engine any form of engine as internal combustion engine may be used and in such case the engine would preferably be stationed at the forward end of the chassis and drive the driving member through a propeller shaft and in such case a transmission gearing would preferably be incorporated with the driving member 49 between the cross members 5—6 or supported by them rigidly. It is to be noted that I contemplate that my device may be used on a front steering means instead of as rear suspension in such case there being used preferably only one of the upper and one lower cylinder at each wheel and these upper and lower cylinders having the related pistons pivotable that is revolvable in them and carrying the wheel hub so that the wheel hub together with the related pistons may be turned relative to their supporting upper and lower cylinder.

Figure 4:
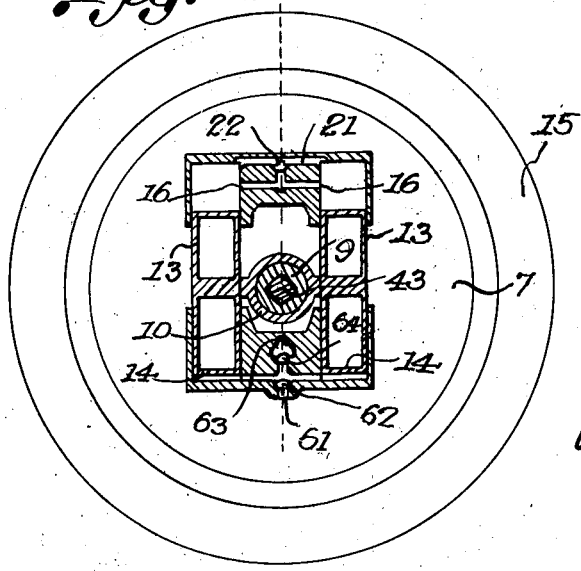
Figure 4 is a view chiefly in vertical cross section similar to that of Figure 2 but showing a different or modified form of my device, some parts being shown in full side elevation.
Figure 5:
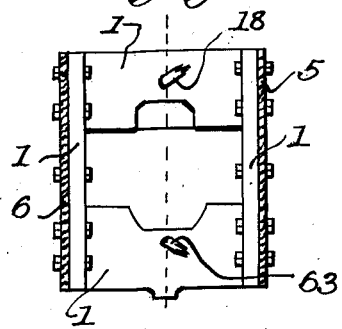
Figure 5 is a view in detail showing the side or inside view of the cylinder casting or forging comprising the main part of my device in the modified form shown in Figure 4, and showing also the attachment of the chassis cross frame members to it.

Referring now to the modified form of my device shown in Figures 4 and 5, this form is in general similar to that of the first form described except that the pistons in the upper cylinders are single acting and the pistons in the lower cylinders are single acting only and thereby a more compact construction may be secured, and in this form the lower pistons draw air from the atmosphere through the port-passage 61 by check valve 62 and compress the air under rebound through conduit 63 to the reservoir 19, check valve 64 preventing return flow. The upper cylinders have connection with the reservoir 19 as in the first form described. None of the cylinders in this form have any oil reservoir or oil pumping spaces but it is to be noted that such devices may be incorporated with this form also in a modified way. In this form the lower cylinders may if desired be of smaller diameter than the upper whereby the compression of the air at a higher pressure will be more effectually secured although it is to be noted that similar diameters will secure some compression but not under as uniform circumstances as the smaller diameter lower cylinders would. The supplementary compression means driven by positively driven means as the steam driving means shown may or may not be incorporated with either form of the device depending upon the construction used. It is to be noted that I contemplate that some supplementary spring suspension means may also be used if desired and that the main castings may if desired be suspended by spring suspension to the chassis frame instead of the rigid suspension shown. While I have shown particular devices and combinations of devices in the illustration of my device I contemplate that other detailed devices and combinations of devices may be used in the realization of my invention without departing from the spirit and intent thereof. It is to be noted that a liquid fluid instead of a gaseous fluid may be used as the yieldable fluid suspension, this having in such case flow to a reservoir under yieldable compression.

What I claim is:

1. In a vehicle suspension means, a pair of broad cross frame members parallelly placed having secured to each end a guide unit, a spindle member related to each guide unit and having a member slidable and retainable by the guide unit, in combination with means whereby the broad cross frame members are yieldably supported by the spindle member.

2. In a vehicle suspension means, a frame having as a component part a pair of broad cross members placed parallel to each other and rigidly secured to the frame, guide units secured one to each end of the pair of broad cross members in combination with a spindle member related to each guide unit and having a slidable member slidable in and retainable by the related guide unit, and yieldable means interposed between the spindle member and the frame.

3. In a vehicle suspension means, a frame having as a component part a pair of broad cross members placed parallel to each other and rigidly secured to the frame, guide units each having upper and lower guides related to each end of the pair of broad cross members in combination with a spindle member related to each guide unit and having a slidable member slidable in and retainable by the guides of the guide unit, and yieldable means interposed between the spindle member and the frame.

4. In a vehicle suspension means, a pair of broad cross members placed in parallel and having at each end of the broad cross members a guide unit forming with the broad members a bolster unit, a spindle member related to each guide unit and having a member slidable in and retainable by the related guide unit, in combination with a fluid retainer adapted to interpose yieldable support between the broad cross member and the spindle member.

5. In a vehicle suspension means, a frame having as a component part a pair of broad cross members placed parallel to each other and rigidly secured to the frame, a guide unit related to each end of the pair of broad cross members in combination with a spindle member related to each guide unit and having a member slidable in and retainable by the guide unit and a fluid retainer adapted to interpose yieldable support between the frame and the spindle member.

6. In a vehicle suspension means, a frame comprising longitudinal members and a pair of broad cross members and guide units rigidly secured together so that a guide unit is fixed at each end of the pair of broad cross members, upper and lower guides in each guide unit, in combination with a wheel-bearing member related to each guide unit and having a slidable member slidable in and retainable by the guides of the guide unit, and a fluid retainer adapted to interpose yieldable support between the frame and the wheel-bearing member.

7. In a fluid suspension means, a wheel spindle having movable support relative to chassis frame, a cylinder and related piston one secured to move with the wheel spindle and the other secured to move with the frame, a reservoir, in combination with means whereby one portion of the cylinder may draw air from the atmosphere and compress it into the reservoir and means whereby air may flow from the reservoir to another portion of the cylinder adapted to interpose yieldable support of the chassis frame upon the wheel spindle.

8. In a fluid suspension means, a wheel spindle having movable support relative to a chassis frame, the cylinder and a related piston one secured to move with the wheel spindle and the other secured to move with the frame and adapted to draw air from the atmosphere and compress the air into a reservoir, in combination with another cylinder and piston unit having one member related to the wheel spindle and the other member related to the chassis frame and means whereby the cylinder may receive air from the reservoir.

9. In a fluid suspension means, a wheel spindle having movable support relative to a chassis frame, a reservoir, a cylinder and related piston one secured to move with the wheel spindle and the other secured to move with the frame and adapted to draw air from the atmosphere and compress the air into the reservoir, in combination with another cylinder and piston unit having one member related to the wheel spindle and the other member related to the chassis frame and means whereby the cylinder may receive air from the reservoir and means whereby the communication between the reservoir and the latter cylinder may be adjustably restricted.

10. In a fluid suspension means, a wheel spindle having movable support relative to a chassis frame, a cylinder and related piston one secured to move with the wheel spindle and the other secured to move with the frame and adapted to interpose yieldable suspension of the frame upon the wheel spindle in combination with a chamber having a liquid and means whereby the chamber is constrictable or expansible according to the relative motion between the wheel and frame and means permitting relatively free passage from the chamber to a reservoir on downward movements of the frame and restricted return passage on recoil movements.

11. In a fluid suspension means, a wheel bearing member having movable support relative to a chassis frame, a cylinder and related piston one secured to move with the wheel bearing member and the other secured to move with the frame, a reservoir, a port providing passage between the cylinder and reservoir and adapted to be covered by the piston, and a passage between the cylinder and the reservoir and non-return valve interposed in the passage whereby movement of fluid from the reservoir to the cylinder is at all times unrestricted but whereby movement of fluid through the passage from the cylinder to the reservoir is prevented.

12. In a fluid suspension means, a wheel bearing member having movable support relative to a chassis frame, a cylinder and related piston one secured to move with the wheel bearing member and the other secured to move with the frame, a reservoir, a port providing passage between the cylinder and reservoir and adapted to be covered by the piston, and a passage between the cylinder and the reservoir and non-return valve interposed in the passage whereby movement of fluid from the reservoir to the cylinder is at all times unrestricted but whereby movement of fluid through the passage from the cylinder to the reservoir is prevented, and means maintaining pressure of fluid in the reservoir.

In witness whereof I have hereunto set my hand this 5th day of December, 1922.

ADOLPHE C. PETERSON.